United States Patent [19]

Delin et al.

[11] 3,941,956

[45] Mar. 2, 1976

[54] APPARATUS FOR INDICATING THE FILLING LEVEL OF SILOS AND THE LIKE

[75] Inventors: Heinz Delin, Wedel, Holstein; Horst Rusbuldt, Hamburg, both of Germany

[73] Assignee: H. Maihak AG, Hamburg, Germany

[22] Filed: Nov. 26, 1973

[21] Appl. No.: 418,817

[30] Foreign Application Priority Data

Nov. 28, 1972 Germany............................ 2258177

[52] U.S. Cl. ............. 200/61.2; 200/61.21; 340/246
[51] Int. Cl.² .................. H01H 35/00; G08B 21/00
[58] Field of Search............... 200/61.2, 61.21, 306; 340/246; 192/41-47, .02 R, 125 D; 310/58, 64, 92, 98, 100, 78, 92; 317/100; 318/40, 114, 119, 301, 306, 335, 482, 489; 64/30 C; 415/19; 416/19, 169, 246, 79, 81; 417/223, 436

[56] References Cited
UNITED STATES PATENTS

| | | | |
|---|---|---|---|
| 2,064,230 | 12/1936 | Starr | 192/45 X |
| 2,116,075 | 5/1938 | Lenhart | 200/61.21 |
| 2,380,595 | 7/1945 | Hertrich | 64/30 C X |
| 2,441,356 | 5/1948 | Hertrich | 417/223 UX |
| 2,647,251 | 7/1953 | Archibald | 340/246 |
| 2,698,362 | 12/1954 | Bozich | 200/61.21 |
| 2,737,274 | 3/1956 | Mouravieff | 192/41 S |
| 2,851,553 | 9/1958 | Grostick | 200/61.21 |
| 2,909,766 | 10/1959 | Bozich | 200/61.21 X |
| 2,961,842 | 11/1960 | Wright | 200/61.21 X |
| 3,210,493 | 10/1965 | Lau | 200/61.2 |
| 3,210,495 | 10/1965 | Lau | 340/246 X |
| 3,548,982 | 12/1970 | Soloviev et al. | 192/45 |
| 3,581,131 | 5/1971 | Richter | 310/58 |
| 3,818,159 | 6/1974 | Evans et al. | 200/61.21 |

OTHER PUBLICATIONS

The Way Things Work; pp., 196, 197; Simon and Schuster, publishers; Vol. 2, 1967, Lib. of Congress Catalog No. 67-27972.

*Primary Examiner*—James R. Scott
*Attorney, Agent, or Firm*—Michael J. Striker

[57] ABSTRACT

An electromotor is mounted on a support and has a shaft extending into the silo or the like. The shaft, which is rotated by the electromotor, carries a blade which contacts the material in the silo when the material rises to a predetermined level. This prevents the blade and shaft from further rotating, and results in the generation of a signal. A free-wheeling device connects the shaft with the motor so that the shaft and motor are coupled for joint rotation in only one direction, but not in the opposite direction.

3 Claims, 7 Drawing Figures

APPARATUS FOR INDICATING THE FILLING LEVEL OF SILOS AND THE LIKE

BACKGROUND OF THE INVENTION

The present invention relates to an apparatus for indicating the filling level of silos and the like.

There are many types of storage receptacles, such as silos, vats, tanks and the like, in which flowable materials such as synthetic plastic powder, soybeans, coal and the like are stored. Very often, the filling level of these storage units, hereafter called "silo" for short, cannot be visually inspected. For this reason it is already known to provide an indicating apparatus which indicates the filling level. This type of apparatus uses an electromotor the output shaft of which drives a blade in rotation. When the filling level of the silo exceeds a preselected level, the material in the silo will be engaged by the rotating blade as it rises up to the level of the latter, and will prevent further rotation of the blade. This, in turn, results in activation of a switch which shuts off the motor and at the same time provides a signal indicative of the fact that the silo has been filled to the desired level.

This prior-art indicating apparatus has, however, various disadvantages. The blade and the shaft on which it is mounted can rotate into mutually opposite directions, i.e., both clockwise and counterclockwise. This means that the switch which shuts off the motor and provides the signal can be actuated both ways, that is either by the shaft turning in clockwise direction or in counterclockwise direction. Assuming that the motor turns the shaft in clockwise direction, it is clear of course that when the shaft is undesirably turned in counterclockwise direction a signal should not be given. Such counterclockwise rotation can, however, occur if for instance material is being admitted into the silo and momentarily should hit one side of the blade, causing it to rotate in counterclockwise direction. Evidently, this results in a false indication of the filling level condition.

Other error sources also exist with the known apparatus. For instance, all movements of the contents of the silo, for instance due to the admission of compressed air, and all other circumstances which reduce the ability of the material to prevent continued rotation of the blade, for instance internal hollows or pockets which might have been formed during pouring of the material and which collapse, can result in the provision of erroneous indications.

The prior-art apparatus seeks to overcome these problems by using delay relays which permit switching on or off of the motor, and generation of a filling level signal, only if the particular circumstance which gives rise to the need for the switching on or off or for the generation of the signal, persists for a certain period of time that is preselected by the delay time of the respective relay. This, however, is an expensive way of solving the problem and therefore not desirable.

In addition, the prior-art equipment has a further disadvantage, namely the danger of damage to various components of the apparatus due to high pressures existing in the particular silo. These pressures can enter the interior of the apparatus housing if bearing seals for the shaft carrying the blade should become defective, and particularly if the silo should contain aggressive gases this can damage the apparatus. The same difficulties exist if moisture should condense in the apparatus housing.

SUMMARY OF THE INVENTION

It is therefore a general object of the invention to overcome the disadvantages of the prior art.

More particularly, it is an object of the present invention to provide an indicating apparatus of the type outlined above which avoids the prior-art disadvantages in a simple and inexpensive manner.

In keeping with the above objects, and with others which will become apparent hereafter, one feature of the invention recites, in an apparatus for indicating the filling level of silos and the like, in a combination which comprises a support, an electromotor mounted on the support, and a filling-level sensor which includes a rotatable shaft driven by the motor and a blade mounted on the shaft. A free-wheeling device connects the shaft with the motor so that the shaft and motor are coupled for joint rotation in only one direction.

According to a further concept of the invention, the apparatus may be provided with a pressure-venting conduit connecting its interior with its exterior so that it is impossible for excessively high and damaging pressures to develop in the interior of the apparatus. This feature is advantageously utilized in combination with the free-wheeling device, but should be understood to be of importance in and of itself, so that the invention contemplates also using the apparatus without the free-wheeling device but with the pressure-venting conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
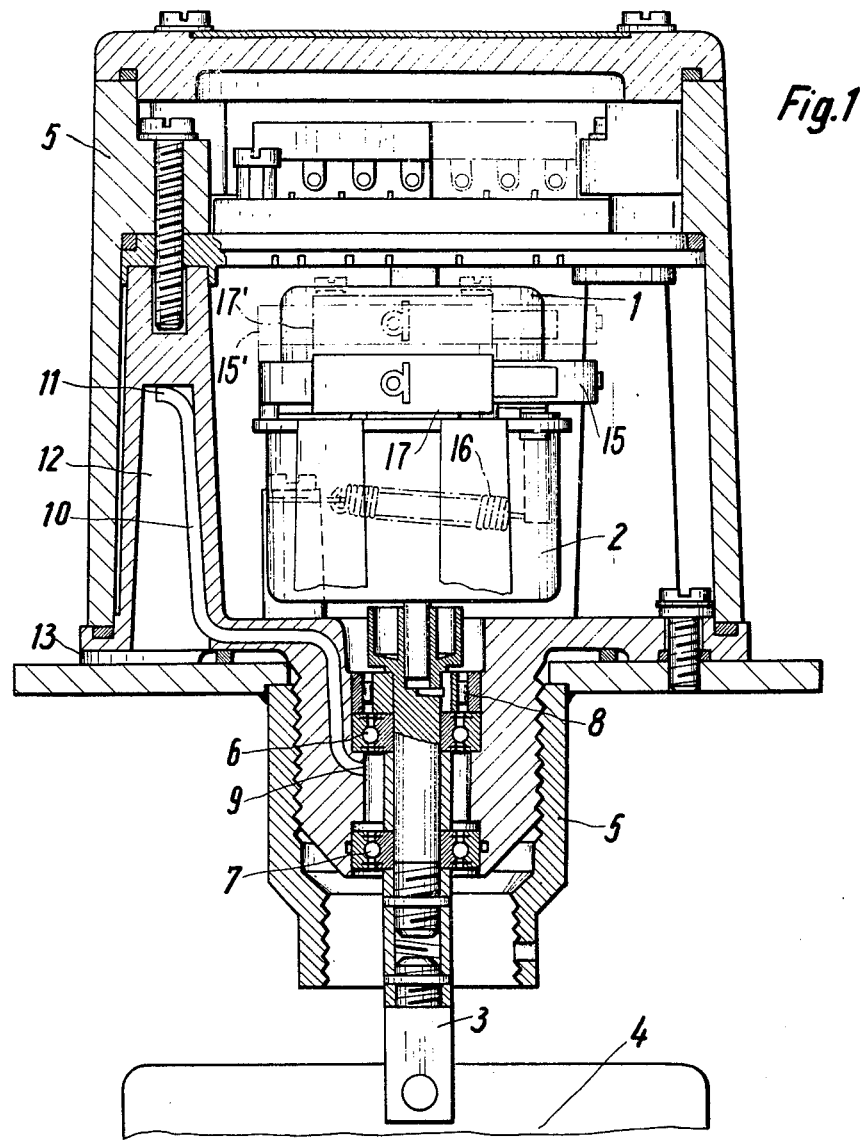
FIG. 1 is a vertical section through an apparatus according to the present invention.

Discussing the drawing now in detail, and referring firstly to the embodiment of FIG. 1, it will be seen that reference numeral 1 identifies an electric motor to which a gear drive is connected. An output shaft of the gear drive 2, which for all intents and purposes can also be considered the output shaft of the electromotor 1, is connected with a shaft 3 on which a blade 4 is mounted. The shaft 3 is journalled in bearings 6 and 7 for rotation, and the bearings 6 and 7 are, in turn, mounted in the housing 5. Above the bearing 6 there is provided a free-wheeling device 8 of known construction which acts as a one-way clutch and couples the shaft 3 with the output shaft of the drive 2 for joint rotation in only one direction.

In the space defined between the bearings 6 and 7 is located one open end 9 of a pressure-venting conduit 10 which has an outer end 11 communicating with a compartment 12 of the housing 5. The lower end of the compartment 12 communicates with the ambient atmosphere surrounding the housing 5, via a channel 13, whereas the upper end 11 of the conduit 10 communicates with the compartment 12 at the upper end of the latter.

The advantage of the venting conduit 10 is that if the seal of the bearing 7—which is capable of withstanding pressures of for instance up to 3 atms—should become defective, and if gases or liquids can now enter under pressure into the space between the bearings 6 and 7, then they will be vented to the outside via the venting conduit 10 as a result of the pressure in the container. This means that pressure cannot reach the interior of the housing 5, which may incidentally be of synthetic plastic material, so that the proper operation of the device will be assured even if the seal of the bearing 7 should have thus become defective. Moreover, the components in the interior of the housing 5 are also protected against aggressive gases which are similarly vented via the conduit 10, and any condensed moisture which could otherwise lead to corrosion of the various components, particularly of the motor and the drive, is also vented.

The entry of dust and liquid from the exterior into the conduit 10, on the other hand, is also largely precluded by the manner in which the end portion 11 of the conduit 10 terminates at the upper end of the compartment 12, whereas it is the lower end of the compartment 12 that communicates via the channel 13 with the ambient atmosphere. This means that if dust should enter from the exterior via the channel 13, it must first become distributed throughout the compartment 12, before it can enter into the end portion 11. Since the volume of the compartment 12 is substantially greater than that which exists at the opening of the end portion 11, the chance that dust would enter into this small opening is very small. The angled shape of the conduit 10 is a further discouragement to the entry of such dust. If liquids should enter from the exterior, on the other hand, they must rise from the level of the channel 13 to that of the opening of the end portion 11, and since the level difference is quite significant, and the chance that large enough amounts of liquid might enter is very small, the protection against liquid is also quite reliable.

Figure 2:
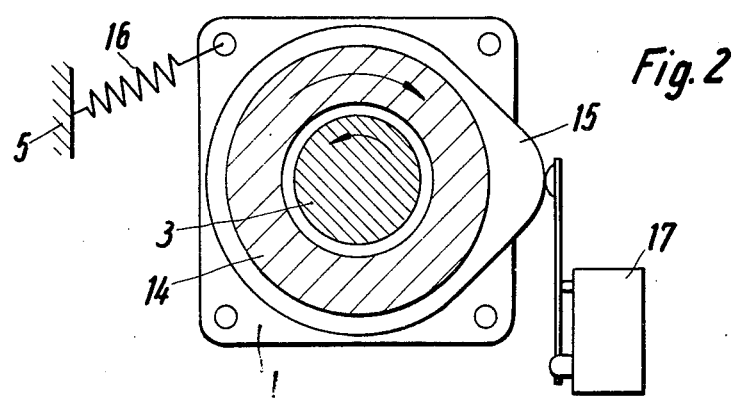
FIG. 2 is a top-plan view, partly in section, of the apparatus in FIG. 1, with parts omitted for the sake of better illustration.

FIG. 2 shows the principle of operation of the apparatus in FIG. 1, when the level of the contents of a silo has risen to the extent where the equipment indicates that the silo is filled. The stator 14 of the motor 1 carries a cam plate 15. In the direction of rotation of the shaft 3, the housing of the motor—which latter is of course freely turnably mounted in the housing 5—is held by the spring 16 which is connected with the housing of the motor 1 and with the housing 5, respectively. A microswitch 17 is located as illustrated and can be operated if engaged by the cam projection of the cam plate 15.

If the contents of the silo rise to the point where they interfere with the turning of the blade 4, the turning of the blade 4 will be stopped by engagement of the blade with the silo contents. Of course, the motor continues to turn and, since the housing of the motor 1 can turn freely, the motor torque results in a reaction force which turns the motor housing in the direction opposite to the previous direction of rotation of the blade 4. The motor housing of the motor 1 thus turns with reference to the housing 5 until the cam of the cam plate 15 engages and operates the microswitch 17. The microswitch 17 is interposed in the power circuit of the motor 1, and when so operated the microswitch interrupts the power circuit and shuts down the motor 1. At the same time a signal is produced to indicate that the preselected filling level has been reached. The motor 1 remains in the position which it has assumed at the time it has been shut off, until subsequently the level of the contents of the silo drops again to such an extent that it recedes out of engagement with the blade 4 so that the latter can turn again. At this time, the spring 16 turns the motor 1 back to its original position, causing the cam of the cam plate 15 to disengage the microswitch 17 which thus closes the power circuit for the motor 1 again, so that the blade 4 begins to turn.

The possibility of wrong indications caused by reverse turning of the blade 4, that is turning in the direction opposite that which is caused by the motor 1, is eliminated with this construction. A brief contacting of the blade with material that might have dropped onto it and caused it to turn in the opposite direction—which it can do because of the free-wheeling device 8—does not produce any operation of the microswitch 17. Only if the blade 4 has been retarded against rotation for approximately 3 seconds, will the motor 1 have turned to the position where the cam of the cam plate 15 can operate the microswitch 17.

Figure 5:
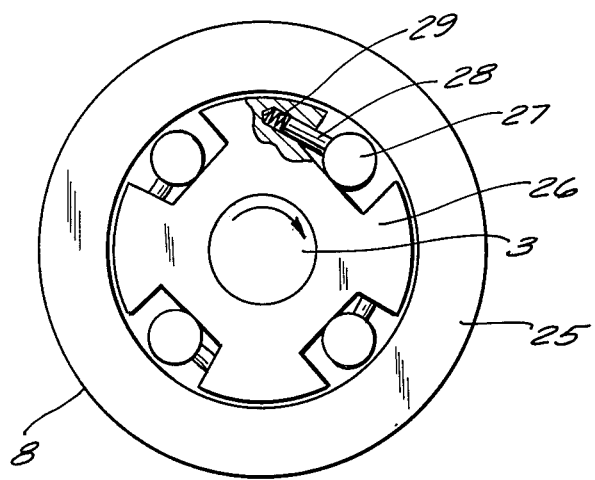
FIG. 5 is a partly sectioned plan view showing details of the free-wheeling device used in the apparatus of the invention.

Details of the device 8 are shown in FIG. 5, where it will be seen to have an outer ring 25 and an inner ring 26; recesses in the latter receive rollers 27 which are biased by springs 29 and pins 28. The ring 26 is fixedly mounted in the housing (not shown in FIG. 5); shaft 3 is fixed to ring 25 and can turn with the same in clockwise direction. An attempt at counter-clockwise rotation causes the rollers 27 to become clamped between rings 25 and 26 and to block such rotation. A device of this type is disclosed in U.S. Pat. No. 2,064,230.

Figure 3A:
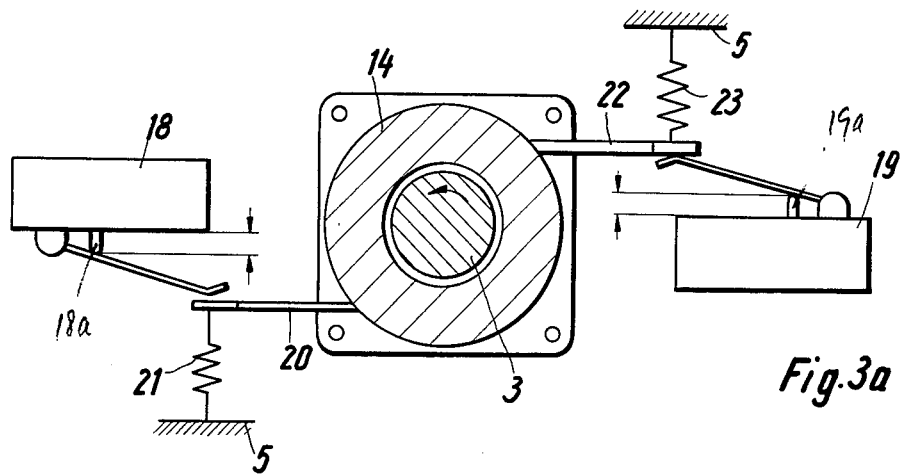
FIGS. 3a–3c are views similar to FIG. 2, but illustrating three different operating positions of a further embodiment of the invention
Figure 3B:
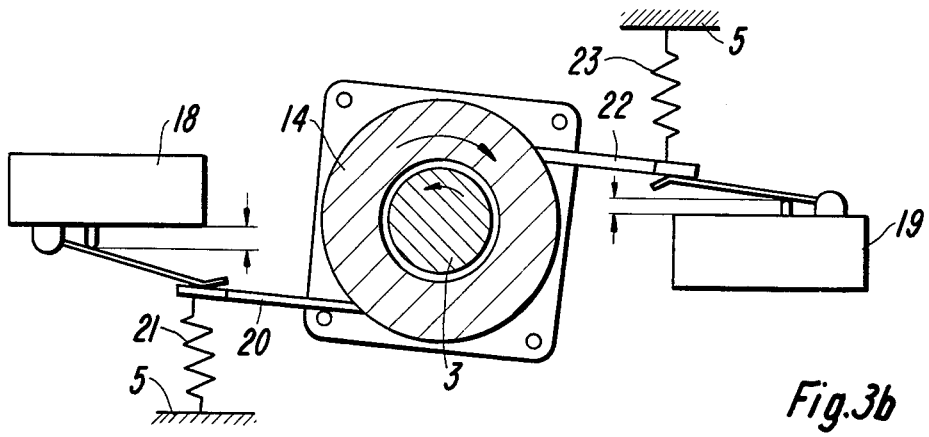
Figure 3C:
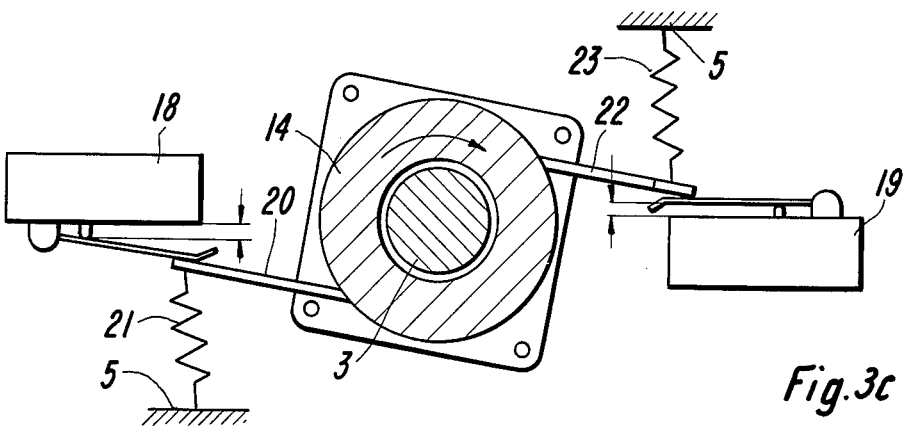
Figure 4:
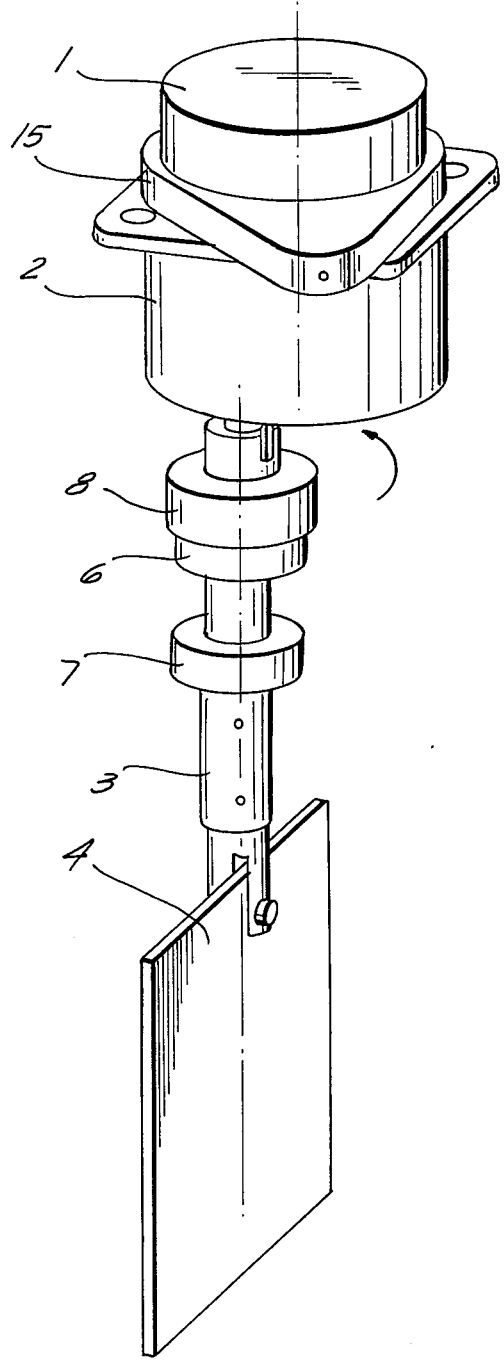
FIG. 4 is a perspective view of the apparatus according to the present invention.

A further embodiment of the invention is illustrated in three operating positions in FIGS. 3a–3c. In this embodiment, two microswitches are utilized for signal delay and stabilization.

FIG. 3 shows that in this embodiment, which structurally is essentially the same as the one in FIGS. 1 and 2, the motor operates to turn the shaft 3 with the blade 4 prior to rising of the level of contents in the silo to the point where the contents can engage the blade 4. At this time the signal-providing switch 19 indicates that the silo is "empty" in that the plunger 19a of this switch is in its farthest outward position.

When, as shown in FIG. 3b, the level of the material has risen to the point where it engages the blade 4 and prevents the latter from turning, the housing of the motor 1 with the stator 14 begins to turn as a result of the reaction force which is generated. This causes the arm 22 that is mounted on the stator 14 or the housing of the motor 1 to move to a position in which it activates the microswitch 19 so that its plunger 19a is depressed and a signal "full" is generated. It takes approximately 1 second after this signal has been generated for the housing of the motor 1 to turn sufficiently so that the arm 20 acts upon the motor switch 18 which is interposed in the motor circuit and depresses its plunger 18a, in order to interrupt the motor circuit and stop the motor. This is shown in FIG. 3.

When subsequently the material level in the silo drops and the blade is free for rotation, the springs 21 and 23 which have been tensioned previously pull the motor back towards the position shown in FIG. 3a from the one in FIG. 3c. This results initially in switching-on of the power for the motor 1, via the switch 18, and subsequently in a switching-on of the switch 19 which provides a "empty" signal. However, a false indication is prevented, for instance an indication that might result from the fact that it is not actually the material that has dropped in the silo but only that a void previously present in the material has collapsed. Since the operation of the switch 19 is somewhat delayed past the operation of the switch 18, the blade 4 can turn to some extent by the newly-energized motor 1, and if in fact there is still material present at its level, which has just slightly receded laterally rather than downwardly due to the fact that a void previously present has collapsed, the blade will again encounter resistance as it moves into contact with the material again, and the motor 1 will be switched off again by its switch 18 without the switch 19 having been operated.

Thus, with the arrangement shown in FIGS. 3a–3c the motor 1 can be switched on and off quite frequently without the status of the signal-generating switch 19 (which provides a "full" level signal) being changed. The signal will change only when the blade 4 can actually turn quite freely again, that is when the level of material in the silo has generally receded below the blade 4.

It will be understood that each of the elements described above, or two or more together, may also find a useful application in other types of constructions differing from the type described above.

While the invention has been illustrated and described as embodied in an apparatus for providing an indication of the filling level of silos and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus for indicating the filling level of silos and like containers, a combination comprising support means; filling level sensing means, including a rotatable shaft mounted on said support means, and a blade mounted on said shaft for rotation with the same until the contents of the container exceed a predetermined level; one-way clutch means interposed between said shaft and said support means and permitting free rotation of said shaft in one direction but non-rotatably coupling said shaft with said support means upon blocking of said shaft and blade against rotation in said one direction; electromotor means having a rotor which is coupled with and drives said shaft in said one direction, and a stator; mounting means mounting said electromotor means on said support means and permitting limited turning of said stator relative to said support means between a normal position which the stator assumes when said shaft rotates in said one direction, and an angularly displaced position which the stator assumes in response to the development of reaction forces resulting from blocking of said shaft and blade against rotation in said one direction; and signal-generating means for generating a signal in response to said stator assuming said displaced position.

2. A combination as defined in claim 1, said stator being capable of also assuming an additional angularly displaced position beyond the first-mentioned displaced position and under the influence of said reaction forces; and further comprising switch means for interrupting the supply of electric energy to said electromotor means in response to said stator assuming said additional displaced position.

3. A combination as defined in claim 1, wherein said support means comprises a housing having a first chamber in which said electromotor means are located, and a second chamber communicating with said first chamber and with the container; said sensing means comprising two bearings axially spaced along said shaft and mounting the same in said second chamber, said bearings forming between themselves a space which is sealed from the container by one of said bearings; and further comprising a venting conduit connecting said space with the exterior of said housing so as to prevent communication between said container and said first chamber in the event the seal formed by said one bearing becomes defective.

* * * * *